United States Patent [19]

Murakami

[11] 4,212,786

[45] Jul. 15, 1980

[54] CRAYON COMPOSITIONS

[75] Inventor: Kimio Murakami, Osaka, Japan

[73] Assignee: Sakura Color Products Corporation, Japan

[21] Appl. No.: 967,855

[22] Filed: Dec. 8, 1978

[30] Foreign Application Priority Data

Dec. 12, 1977 [JP] Japan .................................. 52-149759

[51] Int. Cl.$^2$ ...................... C07D 13/00; C08K 5/09; C08K 5/05
[52] U.S. Cl. .......................... 260/31.2 R; 260/33.2 R; 260/33.4 R; 106/19
[58] Field of Search ...................... 260/31.2 R, 33.4 R, 260/33.2 R, 31.2 N, 31.2 T; 106/19

[56] References Cited

U.S. PATENT DOCUMENTS

| | | | |
|---|---|---|---|
| 2,430,053 | 11/1947 | Hershberger | 260/33.4 R |
| 3,702,314 | 11/1972 | Farjon et al. | 260/31.2 R |

OTHER PUBLICATIONS

Chemical Abstracts, vol. 82, 1975, entry 99513X, Yamose, et al.

*Primary Examiner*—Joseph L. Schofer
*Assistant Examiner*—Peter F. Kulkosky
*Attorney, Agent, or Firm*—McGlew and Tuttle

[57] ABSTRACT

A crayon composition of this invention comprises (a) at least one of cellulose resin and vinyl resin, (b) at least one of ketone resin, xylene resin, amide resin and terpene resin, (c) at least one of dibenzylidene sorbitol, tribenzylidene sorbitol and derivatives of the sorbitols, (d) at least one of glycols, ethers of glycols, ether esters of glycols and benzoic acid esters, and (e) a pigment or an oil-soluble dye.

21 Claims, No Drawings

CRAYON COMPOSITIONS

The present invention relates to drawing crayon compositions.

Crayons are usually prepared by mixing together a natural high-melting wax such as carnauba wax or a synthetic high-melting wax such as fatty acid amide, a medium-melting wax such as hardened oil or paraffin and a liquid oil such as coconut oil or liquid paraffin in a molten state in a suitable combination in accordance with the quality of crayon required, adding a pigment to the molten mixture as a coloring agent, pouring the resulting composition into a specified mold and solidifying the composition by cooling. However, the crayons prepared from this composition have the following drawbacks: (1) The crayon applied have difficulty in adhering to plastics and metal surfaces despite good adhesion to paper. (2) The crayon applied remains adherent for a long period of time such that even when the tip of a finger touches the drawing lines, the crayon sticks to the finger, or when pictures drawn on paper in crayons are allowed to stand as placed one above the other, the color transfers to the overlying sheets. (3) When the crayon is subjected to high-temperature conditions as in the sun, the liquid oil component will ooze from the interior. These drawbacks remain to be remedied insofar as conventional materials are used; for example, the drawback (3) becomes more pronounced when an increased amount of liquid oil is used to afford improved adhesion.

Crayons are also known which are prepared from at least one of dibenzylidene sorbitol, tribenzylidene sorbitol and derivatives of these sorbitols, a resin component and a pigment by dissolving or dispersing the ingredients in an organic solvent with heating and solidifying the resulting composition by cooling (Published Unexamined Japanese Patent Application 34825/1977). Usable as the resin components are ethyl cellulose, cellulose acetate and like cellulose resins, polyvinyl butyral, natural and synthetic rubbers, phenolic resins, ester gum and like rosin esters, acrylic acid resins, petroleum resins, polyvinylidene chloride, polystyrene, vinyl acetate-vinyl chloride copolymer resin, vinyl-ethylene copolymer resin, etc. The crayons of this type have the characteristics of being free of degradation at considerably high temperatures, having good adhesion to surfaces of various materials such as metals, plastics, etc., and being free of color transfer after application since the crayon applied is cured on drying. Notwithstanding these advantages, the crayons still remain to be improved since the crayons are not satisfactory in the smoothness in application and the uniformity of the drawing lines (hereinafter referred to as "drawability"). For example, the crayons obtained with use of cellulose resin, vinyl resins, etc. will have high hardness and cannot be smoothly applicable, whereas the crayons obtained with use of acrylic resins, phenolic resins, etc. will have low hardness and are smoothly usable but fail to give uniform drawing lines. Furthermore, the crayon composition of the above-mentioned ingredients in a liquid state at an elevated temperature has often high viscosity, although depending on the kinds and amounts of the resins, solvents and coloring agents used, thereby presenting difficulty in shaping the mixture with molds or extruders.

An object of this invention is to provide crayons free of the foregoing drawbacks heretofore experienced.

Another object of the invention is to provide crayons which are outstanding in adhesion and stability at high temperatures and also have suitable hardness and excellent drawability.

Another object of the invention is to provide crayons free of color transfer when applied to surfaces.

Still another object of the invention is to provide crayon compositions which have a low viscosity in a liquid state at an elevated temperature and are therefore shapable with ease.

Other objects and features of the present invention will become apparent from the description to follow.

The present invention provides a crayon composition comprising, per 100 parts by weight of the composition,
(a) 10 to 30 parts by weight of at least one of cellulose resin and vinyl resin,
(b) 5 to 30 parts by weight of at least one of ketone resin, xylene resin, amide resin and terpene resin,
(c) 2 to 12 parts by weight of at least one of dibenzylidene sorbitol, tribenzylidene sorbitol and derivatives of the sorbitols,
(d) 25 to 60 parts by weight of at least one of glycols, ethers of glycols, ether esters of glycols and benzoic acid esters, and
(e) 2 to 30 parts by weight of a pigment or 2 to 10 parts by weight of an oil-soluble dye.

My research has revealed that at least one of cellulose resin and vinyl resin (hereinafter referred to as "resin A"), when used, imparts increased hardness to the resulting crayon and gives improved curability on drying and toughness to the crayon applied and that the use of at least one of ketone resin, xylene resin, amide resin and terpene resin (hereinafter referred to as "resin B") enables the resulting crayon to adhere to surfaces of various materials with promoted bond. I have also found that the conjoint use of the resin A and resin B in specified amounts in combination with the above-specified organic solvent and di- or tribenzylidene sorbitol or derivative thereof produces various effects in addition to the effects achieved by the use of the resins, with the result that the crayon obtained has suitable hardness, outstanding drawability, good adhesion, satisfactory stability at high temperatures, and freedom from color transfer since the crayon applied is cured on drying. Moreover, it has been found that the crayon composition comprising the ingredients has a low viscosity in a liquid state at an elevated temperature and is easily shapable with dies or extruders. This invention has been accomplished based on these findings.

These outstanding effects of the invention are produced only when both the resin A and resin B are used conjointly with the specified organic solvent and di- or tri-benzylidene sorbitol or derivatives thereof, but are not achievable otherwise, as when the resin A or B is used singly, or other organic solvents are used. For instance, the use of the resin A alone results in increased hardness and reduced drawability and/or reduced adhesion, whereas if the resin B is used singly, the resulting crayon has good adhesion but reduced drawability and has such an extremely low hardness that it may possibly remain in the form of a liquid. Further when solvents other than the specified organic solvent, such as dialkyl ketone, lower alcohols, xylene and like aromatic hydrocarbons are used, it is impossible to obtain crayons with suitable hardness. Thus the crayons of this invention can be prepared only by the conjoint use of the resin A and resin B in combination with the specific organic solvent and di- or tri-benzylidene sorbitol or derivatives thereof.

In addition to the outstanding characteristics described above, the crayons of this invention are further characterized in that they remain free of degradation and stable in drawability, adhesion, hardness and other properties even when stored for a prolonged period of time. This storage stability is important since crayons are usually used repeatedly from time to time over a long period.

The resin A useful in this invention includes cellulose resin and vinyl resin. Exemplary of suitable cellulose resins are cellulose acetate butyrate containing about 1.0 to about 29.5% by weight of acetyl and about 17 to about 53% by weight of butyl, ethyl cellolose containing about 45 to about 49.5% by weight of ethoxy and acetyl cellulose containing about 53 to about 55% by weight of combined acetic acid. Examples of useful vinyl resins are polyvinyl butyral having a polymerization degree of about 300 to about 2000 and containing about 73 to about 84% by weight of butyral, about 9 to about 24% by weight of hydroxyl and about 2.0 to about 8.4% by weight of acetyl, polyvinyl acetate having a polymerization degree of about 50 to about 2000 and ethylene-vinyl acetate copolymer having a molecular weight of about 20,000 to about 100,000 and containing about 15 to about 40% by weight of vinyl acetate. Preferable among these examples is polyvinyl butyral having a polymerization degree of about 300 to about 2000 and containing up to about 3% by weight of acetyl, about 15 to about 24% by weight of hydroxyl and about 73 to about 77% by weight of butyral. These resins A are used in an amount of about 10 to about 30 parts by weight, preferably about 15 to about 25 parts by weight, per 100 parts by weight of the crayon composition. With less than 10 parts by weight of the resin A used, the resulting crayon will not have sufficient hardness, while above 30 parts by weight, excessively high hardness will often tend to result. In either case it becomes difficult to give outstanding drawability to the crayon.

The resin B includes amide resin, ketone resin, xylene resin and terpene resin. Examples of amide resins are thermoplastic resins prepared by the condensation polymerization of dimer acid and di- or poly-amine and having a molecular weight of about 4000 to about 9000. Examples of useful xylene resins are a condensation product of meta-xylene and formalin (about 350 to about 600 in molecular weight) and a condensation product of meta-xylene and formalin which product is modified with an alkyl phenol having $C_{1-6}$ alkyl (about 1200 to about 1300 in molecular weight). Examples of useful terpene resins are synthetic terpene resin (about 550 to about 650 in molecular weight) prepared from turpentine oil, synthetic terpene resin (about 1000 to about 2000 in molecular weight) prepared from an aliphatic olefin, diolefin or like unsaturated hydrocarbon and terpenephenol copolymer (about 600 to about 760 in molecular weight). Examples of useful ketone resins include a condensation product of cyclohexanone and formaldehyde having a softening point of about 100° to about 130° C. These resins B are used in an amount of about 5 to about 30 parts by weight, preferably about 10 to about 20 parts by weight, per 100 parts by weight of the crayon composition. With a lesser amount of the resin B present, reduced adhesion will result with difficulty encountered in gelation, whereas use of a larger amount will afford crayons having low hardness and poor drawability.

Dibenzylidene sorbitol or tribenzylidene sorbitol and derivatives of these sorbitols useful in this invention are condensation products of sorbitol and an aromatic aldehyde of the formula

wherein R is hydrogen or alkyl having 1 to 3 carbon atoms. Although condensation products of an aromatic aldehyde and a polyhydric alcohol with not less than 5 hydroxyl groups such as xylitol, mannitol and the like act to solidify organic solvents, the condensation products of the aromatic aldehyde and sorbitol alone are especially effective in this respect. Examples of useful dibenzylidene sorbitol derivatives are compounds in which the benzene nucleus of each benzylidene group of dibenzylidene sorbitol has a $C_{1-3}$ alkyl group at an optional position, such as [di-(p-methylbenzylidene)]-sorbitol, [di-(m-ethylbenzylidene)]-sorbitol, etc. Similarly examples of useful tribenzylidene sorbitol derivatives are compounds in which the benzene nucleus of each benzylidene group of tribenzylidene sorbitol has a $C_{1-3}$ alkyl group at an optional position, such as [tri-(p-methylbenzylidene)]-sorbitol, [tri-(m-ethylbenzylidene)]-sorbitol, etc. According to this invention, dibenzylidene and tribenzylidene sorbitols and derivatives thereof may be used singly or in admixture. These compounds are used in an amount of about 2 to about 12 parts by weight, preferably about 3 to about 8 parts by weight per 100 parts by weight of the crayon composition, although dependent on the amounts of the resins A and B used. If less than 2 parts by weight of the component is used, difficulties are encountered in effecting gelation whereas with more than 12 parts by weight of the component used, the resulting crayon will be too hard.

The organic solvents useful in this invention are those having a boiling point of about 100° to about 250° C. and capable of effectively dissolving the resins A and B, di- and tri-benzylidene sorbitols and derivatives thereof. Examples of preferred solvents are glycols, ethers of glycols, ether esters of glycols and benzoic acid esters. Examples of glycols are ethylene glycol, diethylene glycol, propylene glycol, hexylene glycols, etc. Examples of ethers of glycols are methyl ethers, ethyl ethers, propyl ethers, butyl ethers and the like of the above-mentioned glycols. Examples of ether esters of glycols are acetates, propionates and the like of the above-mentioned glycol ethers. Exemplary of benzoic acid esters are ethyl benzoate, butyl benzoate, etc. These solvents are used singly or in admixture in an amount of about 25 to about 60 parts by weight, preferably about 30 to about 55 parts by weight, per 100 parts by weight of crayon composition.

Examples of useful coloring agents are known pigments used for crayons, marking inks and the like and oil-soluble dyes. At least one of these coloring agents is used. Oil-soluble dyes are dispersible in the present crayon compositions more uniformly, giving uniform, transparent and attractive colors to, but are generally inferior to pigments in fastness to light. Examples of pigments useful in this invention are titanium dioxide, red iron oxide, ultramarine, carbon black, Carmine 6B, Phthalocyanine Blue, Lake Red and pigments processed with nitro cellulose. These pigments are used in an amount of about 2 to about 30 parts by weight, preferably about 4 to about 25 parts by weight, per 100 parts by weight of crayon composition. Below about 2 parts by weight, the pigment generally fails to serve as a coloring agent, while amounts over about 30 parts by weight, if used, will not provide further improved coloring effect. Oil-soluble dyes are those generally known, such as phthalocyanine dyes, pyrazolone dyes, Nigrosine dyes, anthraquinone dyes, azo dyes, chromium complex dyes, etc. Examples of phthalocyanine dyes are Oil Blue BOS (trade mark, product of Orient Chemical Industries Ltd., Japan), Solvent Blue 55 (e.g. Neozapon Blue FLE, trade mark, product of BASF AG., West Germany), etc. Examples of pyrazolone dyes are Solvent Yellow 19 (e.g. Vari Fast Yellow 3104, trade mark, product of Orient Chemical Industries Ltd., Japan), Solvent Yellow 21 (e.g. Neozapon Yellow R, trade mark, product of BASF AG., West Germany), etc. Examples of Nigrosine dyes are Solvent Black 5 (e.g. Nigrosine Base, trade mark, product of Chuo Gosei Kagaku Co., Ltd., Japan), etc. Examples of anthraquinone dyes are Solvent Violet 14 (e.g. Oil Violet 732, trade mark, product of Orient Chemical Industries Ltd., Japan), etc. Examples of azo dyes are Fast Orange RR (trade mark, product of Dainichi Seika Color & Chemicals Manufacturing Co., Ltd., Japan), etc. Examples of chromium complex dyes are Neozapon Black RE (trade mark, product of BASF AG., West Germany), etc. These dyes are used in an amount of about 2 to about 10 parts by weight, preferably about 3 to about 7 parts by weight, per 100 parts by weight of the crayon composition. If less than about 2 parts by weight of the dye is used, the desired color effect will not be achieved, whereas use of more than about 10 parts by weight of the dye is unlikely to produce noticeably improved effect. According to this invention, the pigment and dye are conjointly usable for adjusting color of the crayon as desired.

The crayon compositions of this invention may incorporate known plasticizers in addition to the essential ingredients described to ensure still improved drawability. Various plasticizers generally used for crayons are usable. Examples are phthalates such as diethyl phthalate, dibutyl phthalate, dioctyl phthalate and butylbenzyl phthalate, epoxy compounds such as 2-ethylhexyl epoxyhexahydrophthalate, 2-ethylhexyl sebacate and tricresyl phosphate. These plasticizers are used in an amount of about 2 to about 10 parts by weight per 100 parts by weight of the crayon composition.

For illustrative purposes, a process for preparing the crayon compositions of this invention is described below. First, the resin A is dissolved in the organic solvent with stirring and, when desired, with slight heating. When a dye is used as the coloring agent, the dye is added to the resin A solution with stirring to obtain a uniform solution or dispersion. A pigment, when used, is added to the resin A solution, and the mixture is thoroughly kneaded in a pot mill or by a three-roll mixer. For this procedure, it is preferable to add a suitable portion of the resin A solution to the pigment, knead the resulting mixture and thereafter add the remaining portion of the resin A solution to the mixture. Subsequently at least one of di- and tri-benzylidene sorbitols and derivatives thereof is added to the resulting solution, dipersion or mixture, and the mixture obtained is heated to a temperature close to the boiling point of the solvent used with stirring to prepare a uniform solution, to which the resin B is slowly added to fully dissolve the resin B therein at the same temperature as above, thereby obtaining a crayon composition. The crayon composition thus obtained in a liquid state has a low viscosity of about 100 to about 1500 cps.

The crayon of this invention are prepared by the following method. The composition in a liquid state at an elevated temperature is placed into a mold and solidified by cooling. Alternatively the composition is extruded into a cylinder, square pillar or the like at room temperature. The crayon composition in a liquid state has a low viscosity as mentioned above and is therefore advantageously shapable with molds or extruders.

The crayons of this invention prepared by the above method are used or preserved preferably as contained in suitable closed cases. The crayons remain free of degradation over a prolonged period of time even when not so encased since a film is formed over the surface of the crayon. Although exhibiting reduced drawability when starting to draw, the crayon is smoothly usable free of any particular trouble after the film formed over the outer end of the crayon is broken by the initial drawing pressure. Examples of useful cases are those resembling the cases for putting up rouges and glue sticks, those comprising a tube of air-impermeable material, such as aluminum foil, resin film, aluminum foil-resin film composite sheet or paper impregnated with resin, and a cap or lid attached to each end of the tube.

The crayons of this invention have suitable hardness and are smoothly applicable on sheets and plates of plastics and metals and various other materials with high uniformity. Even when the crayons are subjected to high temperatures, the liquid component will not ooze from the interior. The crayon applied is excellent in adhesion and free of any color transfer since the crayon applied is cured on drying. The crayons retain these outstanding characteristics substantially free of any changes even after a long period of storage.

The present invention will be described below in greater detail with reference to examples and comparison examples, in which all the parts and percentages are by weight.

The crayons prepared in these examples are tested for properties by the following methods.

1. Viscosity

Viscosity of the crayon composition in a liquid state at an elevated temperature is measured on a Brookfield-type viscosimeter.

2. Gel hardness

A semiconductor pressure transducer (Model PMS-5, 10H, product of Toyota Koki Co., Ltd., Japan) is used which includes a movable portion vertically movable up and down at a stroke of 8 mm and cycle of 2 seconds with its pressure sensor facing down. The sensor is secured to the movable part so that the surface of the specimen crayon, 60 mm in diameter and 50 mm in length, will be positioned at the midpoint of the stroke. The specimen is horizontally moved at least 15 mm every stroke of the movable portion, and at least 3 strokes are repeated. The maximum pressure values under which the specimen remains unbroken are measured. The average of the values is given as the result.

3. Adhesion

The specimen crayon is thoroughly applied to the entire surface of a substrate listed in Table 1, and the crayon applied is dried for 24 hours at room temperature. Then adhesive tape is stuck onto the substrate, fully pressed with a uniform force and peeled off rapidly. The adhesion of the crayon applied to the surface is rated as follows:

A: None of the crayon applied is removed.
B: a minor part of the crayon applied is removed.
C: a half to major part of the crayon applied is removed.
D: the crayon applied is easily removed from the surface.

4. Drawability

The smoothness with which the specimen is applicable and the uniformity of the drawing lines are evaluated according to the following criteria:

A: Excellent
B: Good
C: Fair
D: Poor

EXAMPLE 1

In 46 parts of 3-methoxy butanol is dissolved 20 parts of polyvinyl butyral (trade mark "Denka Butyral #2000L," product of Denki Kagaku Kogyo Co., Ltd., Japan, polymerization degree 300, up to 3% acetyl, 20 to 24% hydroxyl, at least (73% butyral). Carbon black (8 parts) is added to 20 parts of the resin solution, and the mixture is fully kneaded with a three-roll mixer. The remaining 46 parts of the resin solution, 10 parts of ethyl benzoate and 4 parts of dibutyl phthalate are added to the mixture. The mixture is heated to 130° C., and 6 parts of dibenzylidene sorbitol is completely dissolved in the mixture with stirring. Subsequently 16 parts of xylene resin (trade mark "Nikanol HP120," product of Mitsubishi Gas Kagaku Kogyo Co., Ltd., Japan prepared by modifying a condensation product of meta-xylene and formalin with alkyl phenol, molecular weight 1300, softening point 105° to 135° C., specific gravity 1.06) is slowly added to the solution and completely dissolved therein at the same temperature, giving a composition. The resulting composition is placed into a specified container, cooled for solidification and withdrawn therefrom.

Table 1 shows the viscosity of the crayon composition used for preparing the crayon thus obtained (hereinafter referred to as "Crayon 1") and gel hardness and drawability of the Crayon 1 and adhesion of the Crayon 1 applied.

Drawing lines produced by applying the Crayon 1 onto a paper is allowed to stand for 10 minutes at room temperature to cure. A finger is slightly placed on the lines and checked for the transfer of the color. It is found that the lines does not permit any color transfer.

The Crayon 1 is subjected to a high temperature of 80° C. for 60 minutes and thereafter the appearance of the Crayon 1 is observed. No oozing of the liquid component is observed, showing the stability at high temperature.

The Crayon 1 is placed in a capped case resembling the case for putting up rouges having an interior space, 12 mm in inside diameter and 60 mm in length, then allowed to stand for 6 months at room temperature with a cap closed, and thereafter put to use. The Crayon 1 is found usable free of degradation in properties. It is further observed that the Crayon 1 is stable even after the storage of 2 years at room temperature.

In the same manner as above, crayons of this invention are prepared from the crayon compositions given below.

EXAMPLE 2

| | |
|---|---|
| Polyvinyl butyral (trade mark "Denka Butyral #2000L") | 20.0 parts |
| Titanium white | 24.0 parts |
| Ethylene glycol monobutyl ether | 34.0 parts |
| Ketone resin (trade mark "Hilac 111," product of Hitachi Kasei Co., Ltd., Japan, softening point 100° C. to 130° C.) | 15.0 parts |
| Methyl benzoate | 10.0 parts |
| Dibenzylidene sorbitol | 5.0 parts |

EXAMPLE 3

| | |
|---|---|
| Polyvinyl butyral (trade mark "Denka Butyral #2000L") | 20.0 parts |
| Carbon black | 8.0 parts |
| Amide resin (trade mark "Versamid 711," product of Daiichi General Co., Ltd., Japan, softening point 111° C., viscosity 3 poises at 160° C.) | 9.0 parts |
| Terpene-phenol copolymer (trade mark "Polyester T-115," product of Yasuhara Yushi Co., Ltd., Japan, molecular weight 720, softening point 115° C., specific gravity 1.03) | 12.0 parts |
| 3-Methoxy-butyl acetate | 6.0 parts |
| Ethylene glycol monobutyl ether | 40.0 parts |
| Ethyl benozate | 8.0 parts |
| Dibenzylidene sorbitol | 5.2 parts |

EXAMPLE 4

| | |
|---|---|
| Polyvinyl butyral (trade mark "Denak Butyral #2000L") | 18.0 parts |
| Red 1547 (C.I. 15865) | 9.0 parts |
| Ketone resin (trade mark "Hilac 111") | 15.0 parts |
| Dibutyl phthalate | 8.0 parts |
| 3-Methoxy butanol | 22.0 parts |
| 3-Methoxy-butyl acetate | 22.0 parts |
| Ethyl benzoate | 10.0 parts |
| Dibenzylidene sorbitol | 6.6 parts |

EXAMPLE 5

| | |
|---|---|
| Cellulose acetate butyrate (trade mark "CAB 381-½" " product of Eastman Chemical Products, Inc., U.S.A., melting point 155° C. to 165° C., viscosity 1.12 to 1.88 at melting point, specific gravity 1.20) | 18.5 parts |
| Titanium white | 24.0 parts |
| Ketone resin (trade mark "Hilac 111") | 15.0 parts |
| Dibutyl phthalate | 8.0 parts |
| 3-Methoxy-butyl acetate | 33.0 parts |
| Methyl benzoate | 8.0 parts |
| Dibenzylidene sorbitol | 4.5 parts |

EXAMPLE 6

| | |
|---|---|
| Cellulose acetate butyrate (trade mark "CAB- 381½" ") | 20.0 parts |
| Benzidine Yellow-2200 (C.I. 21090, product of Dainichi Seika Color & Chemicals Manufacturing Co., Ltd., Japan) | 5.0 parts |
| Titanium white | 12.0 parts |
| Xylene resin (trade mark "Nikanol HP120") | 15.0 parts |
| Ethylene glycol monobutyl ether | 42.5 parts |
| Ethyl benzoate | 10.0 parts |
| Dibenzylidene sorbitol | 4.5 parts |

EXAMPLE 7

| | |
|---|---|
| Polyvinyl butyral (trade mark "Denka Butyral #2000L") | 20.0 parts |
| Terpene-phenol copolymer (trade mark "Polyester T-115") | 16.0 parts |
| Carbon black | 8.0 parts |
| 3-Methoxy-butanol | 8.0 parts |
| Dibenzylidene sorbitol | 5.5 parts |
| Ethylene glycol monoethyl ether | 42.5 parts |

Crayons obtained in Examples 2 to 7 are fully comparable to the Crayon 1 in respect of the properties. Table 1 shows the viscosity of the crayon compositions used for preparing these crayons, and gel hardness and drawability of the crayons and adhesion of the crayons applied.

Comparison Examples 1 to 4

Comparison crayons of the compositions listed below are prepared in the same manner as in Example 1 except that the materials used are cellulose acetate butyrate (trade mark "CAB-381-½'") or polyvinyl butyral (trade mark "Denka Butyral #2000L") as the resin A, a ketone resin (trade mark "Hilac 111,") or xylene resin (trade mark "Nikanol HP120") as the resin B, and ethylene glycol monobutyl ether as a solvent.

| | Parts by weight Comparison Example | | | |
|---|---|---|---|---|
| Ingredient | 1 | 2 | 3 | 4 |
| Resin A | | | | |
| Cellulose acetate butyrate | 31.5 | — | — | — |
| Polyvinyl butyral | — | 36.0 | — | — |
| Resin B | | | | |
| Ketone resin | — | — | 31.5 | — |
| Xylene resin | — | — | — | 36.0 |
| Dibenzylidene sorbitol | 4.5 | 5.0 | 4.5 | 5.0 |
| Dibutyl phthalate | 4.0 | 4.0 | 4.0 | 4.0 |
| Solvent | 61.0 | 55.0 | 61.0 | 55.0 |
| Carbon black | 8.0 | 8.0 | 8.0 | 8.0 |

Table 1 shows the viscosity of the crayon composition of the ingredients used for the crayons of Comparison Examples 1 to 4, and the gel hardness and drawability of the crayons and adhesion of the crayons applied.

Table 1

| | | Viscosity (cps) | Gel hardness (kg/cm$^2$) | Drawability | | | Adhesion | | |
|---|---|---|---|---|---|---|---|---|---|
| | | | | Paper[1] | Plastics[2] | Steel[3] | Paper[1] | Plastics[2] | Steel[3] |
| Ex. | 1 | 1300 | 18.5 | A | B | A | A | A | B |
| | 2 | 200 | 28.4 | A | A | B | A | A | A |
| | 3 | 1400 | 22.5 | A | B | A | A | B | B |
| | 4 | 1000 | 20.1 | A | B | A | A | A | B |
| | 5 | 500 | 30.7 | A | A | B | A | A | A |
| | 6 | 300 | 29.4 | A | A | A | A | A | A |
| | 7 | 700 | 18.3 | A | A | A | A | B | B |
| Comp. Ex. | 1 | 700 | 30.1 | C | B | C | A | C | C |
| | 2 | 1000 | 25.6 | B | C | B | A | D | B |
| | 3 | 100 | 0[4] | — | — | — | — | — | — |
| | 4 | 100 | 0[4] | — | — | — | — | — | — |

Note
[1] Paper board (Kent Paper) according to JIS P3301.
[2] a rigid polyvinyl chloride sheet
[3] a plate of steel according to JIS G3101.
[4] not solidified.

Table 1 reveals that the crayons of this invention have suitable hardness and are outstanding in drawability and in adhesion. In contrast it is seen that the crayons prepared with the use of the resin A alone are poor in adhesion and/or drawability and that the compositions incorporating the resin B only are unable to solidify.

In the same manner as in Example 1, crayon of this invention are prepared from the various crayon compositions given below.

EXAMPLE 8

| | |
|---|---|
| Cellulose acetate butyrate (trade mark "CAB 381-½" ") | 17.0 parts |
| Amide resin (trade mark "Versamid 711") | 15.0 parts |
| Titanium dioxide | 7.0 parts |
| Dibutyl phthalate | 5.0 parts |
| Dibenzylidene sorbitol | 6.0 parts |
| Ethylene glycol monoethyl ether acetate | 50.0 parts |

The crayon composition has a viscosity of 100 cps. The crayon obtained therefrom has a gel hardness of 25.6 kg/cm$^2$.

EXAMPLE 9

| | |
|---|---|
| Cellulose acetate butyrate (trade mark "CAB 381-½" ") | 10.0 parts |
| Polyvinyl acetate (trade mark "Gosenyl N-25," product of Nippon Synthetic Chemical Industry Co., Ltd., Japan) | 15.0 parts |
| Ketone resin | 12.0 parts |

| (trade mark "Hilac 111") | |
| --- | --- |
| Titanium white | 20.0 parts |
| Dibutyl phthalate | 4.0 parts |
| Dibenzylidene sorbitol | 5.0 parts |
| 3-Methoxy-butyl acetate | 41.0 parts |

The crayon composition has a viscosity of 800 cps, and the crayon obtained therefrom has a gel hardness of 23.6 kg/cm$^2$.

EXAMPLE 10

A 20-part quantity of cellulose acetate butyrate (trade mark "CAB 381-½",") and 5 parts of dibutyl phthalate are added to 55 parts of ethylene glycol monobutyl ether and completely dissolved therein. Subsequently 6 parts of Neozapon Black RE (product of BASF AG., West Germany) is added to and dissolved in the solution. The resulting solution is heated to 130° C., and 4 parts of dibenzylidene sorbitol is added to and completely dissolved in the solution with stirring. A 10 part quantity of amide resin (trade mark "Versamid 711,") is slowly added to and completely dissolved in the solution while maintaining the solution at 130° C., to obtain a composition having a viscosity of 200 cps. The resulting composition is placed into a specified container and cooled for solidification. The crayon thus obtained has a gel hardness of 25.2 kg/cm$^2$.

EXAMPLE 11

In the same manner as in Example 10, a crayon is prepared from the following composition.

| Polyvinyl butyral | 20.0 parts |
| --- | --- |
| (trade mark "Denka Butyral #2000L") | |
| Xylene resin | 15.0 parts |
| (trade mark "Nikanol HP120") | |
| Neozapon Blue FLE | 5.0 parts |
| (product of BASF AG., West Germany) | |
| Dibutyl phthalate | 5.0 parts |
| Dibenzylidene sorbitol | 6.0 parts |
| 3-Methoxy butanol | 52.0 parts |

The crayon composition has a viscosity of 1000 cps and the crayon obtained therefrom has a gel hardness of 24.0 kg/cm$^2$.

EXAMPLE 12

In the same manner as in Example 10, a crayon is prepared from the following composition.

| Ethyl cellulose | 17.0 parts |
| --- | --- |
| (trade mark "Etocell 7," product of The Dow Chemical Co., U.S.A.) | |
| Xylene resin | 15.0 parts |
| (trade mark "Nikanol HP120") | |
| Phthalocyanine Blue | 8.0 parts |
| (C.I. 74160) | |
| Titanium white | 17.0 parts |
| Dibutyl phthalate | 5.0 parts |
| Dibenzylidene sorbitol | 6.0 parts |
| Methyl benzoate | 38.0 parts |

The crayon composition has a viscosity of about 1500 cps and the crayon obtained therefrom has a gel hardness of 30.0 kg/cm$^2$.

The crayons obtained in Examples 8 to 12 are substantially equivalent in properties to the crayons obtained in Examples 1 to 7.

Crayons are further prepared in the same manner as in Example 1 except that dibenzylidene sorbitol is replaced by di-(p-methylbenzylidene)sorbitol, tribenzylidene sorbitol or tri-(p-methylbenzylidene)sorbitol. The crayons are found to be comparable to those of Examples 1 to 12 in hardness, adhesion, drawability and like properties.

Comparison Examples 5 to 8

Crayons are prepared in the same manner as in Example 1 except that the following solvents are used.

| Comparison Example | Solvent |
| --- | --- |
| 5 | Butyl alcohol |
| 6 | Heptane |
| 7 | Diisobutyl ketone |
| 8 | Xylene |

The crayons have such a low gel hardness that they are almost unable to solidify except the crayon obtained in Comparison Example 5, which, however, is very inferior to crayons obtained in Examples 1 to 12 in drawability, adhesion and like properties.

What I claim is:

1. A drawing crayon composition comprising, per 100 parts by weight of the composition,
   (a) 10 to 30 parts by weight of at least one member selected from the group consisting of an ester of cellulose, ether or cellulose, polyvinyl butyral, polyvinyl acetate and ethylenevinyl acetate copolymer,
   (b) 5 to 30 parts by weight of at least one member selected from the group consisting of a condensation product of cyclohexanone and formaldehyde, a condensation product of meta-xylene and formaldehyde, a condensation product of meta-xylene and formaldehyde which product is modified with an alkyl phenol having $C_{1-6}$ alkyl, an amide resins prepared by the condensation polymerization of dimer acide and di- or poly-amine, a synthetic terpene resin prepared from turpentine oil, a synthetic terpene resin prepared from an unsaturated hydrocarbon and a terpene-phenol copolymer,
   (c) 2 to 12 parts by weight of at least one dibenzylidene sorbitol, tribenzylidene sorbitol and derivatives of the sorbitols,
   (d) 25 to 60 parts by weight of at least one of glycols, ethers of glycols, ether esters of glycols and benzoic acid esters, and
   (e) 20 to 30 parts by weight of a pigment or 2 to 10 parts by weight of an oil-soluble dye.

2. A crayon composition as defined in claim 1 wherein the component (a) is used in an amount of 15 to 25 parts by weight per 100 parts by weight of the composition.

3. A crayon composition as defined in claim 1 wherein the component (b) is used in an amount of 10 to 20 parts by weight per 100 parts by weight of the composition.

4. A crayon composition as defined in claim 1 wherein the component (c) is at least one of dibenzylidene sorbitol and derivatives thereof in which the benzene nucleus of each benzylidene has a $C_{1-3}$ alkyl substituent at an optional position.

5. A crayon composition as defined in claim 1 wherein the component (c) is at least one of tribenzylidene sorbitol and derivatives thereof in which the benzene nucleus of each benzylidene has a $C_{1-3}$ alkyl substituent at an optional position.

6. A crayon composition as defined in claim 1 wherein the component (c) is used in an amount of 3 to 8 parts by weight per 100 parts by weight of the composition.

7. A crayon composition as defined in claim 1 wherein the component (d) is at least one of glycols.

8. A crayon composition as defined in claim 1 wherein the component (d) is at least one of ethers of glycols.

9. A crayon composition as defined in claim 1 wherein the component (d) is at least one of ether esters of glycols.

10. A crayon composition as defined in claim 1 wherein the component (d) is at least one of benzoic acid esters.

11. A crayon composition as defined in claim 1 wherein the component (d) is used in an amount of 30 to 55 parts by weight per 100 parts by weight of the composition.

12. A crayon composition as defined in claim 1 wherein the component (e) is at least one pigment.

13. A crayon composition as defined in claim 12 wherein the pigment is used in an amount of 4 to 25 parts by weight of the composition.

14. A crayon composition as defined in claim 1 wherein the component (e) is at least one oil-soluble dye.

15. A crayon composition as defined in claim 14 wherein the oil-soluble dye is used in an amount of 3 to 7 parts by weight per 100 parts by weight of the composition.

16. A crayon composition as defined in claim 1 wherein the component (a) is at least one of an ester of cellulose and an ether of cullolose.

17. A crayon composition as defined in claim 1 wherein the component (a) is at least one of polyvinyl butyral, polyvinyl acetate and ethylene-vinyl acetate copolymer.

18. A crayon composition as defined in claim 1 wherein the component (b) is a condensation product of cyclohexanone and formaldehyde.

19. A crayon composition as defined in claim 1 wherein the component (b) is at least one of a condensation product of meta-xylene and formaldehyde and a condensation product of meta-xylene and formaldehyde which product is modified with an alkyl phenol having $C_{1-6}$ alkyl.

20. A crayon composition as defined in claim 1 wherein the component (b) is at least one of an amide resin prepared by the condensation polymerization of dimer acid and di- or polyamine.

21. A crayon composition as defined in claim 1 wherein the component (b) is at least one of a synthetic terpene resin prepared from turpentine oil, synthetic terpene resin prepared from an unsaturated hydrocarbon and terpene-phenol copolymer.

* * * * *